United States Patent [19]

Yajima et al.

[11] Patent Number: 5,472,797
[45] Date of Patent: Dec. 5, 1995

[54] OPTICAL ELEMENTS HAVING CURED COATING FILM

[75] Inventors: Eiichi Yajima, Fuchu; Yoshitane Watanabe, Tokyo; Keitaro Suzuki, Chiba; Tetsunori Matsukura, Sodegaura, all of Japan

[73] Assignee: Hoya Corporation, Japan

[21] Appl. No.: 86,801

[22] Filed: Jul. 7, 1993

[30] Foreign Application Priority Data

Jul. 7, 1992 [JP] Japan .................. 4-202958

[51] Int. Cl.$^6$ .................. B32B 9/00
[52] U.S. Cl. .................. 428/688; 428/908.8; 428/689; 428/701; 428/702; 428/403; 428/404; 106/286.4; 106/441; 106/450; 106/479
[58] Field of Search .................. 428/688, 689, 428/701, 702, 333, 338, 432, 472, 403, 404, 908.8; 430/527; 204/192.26; 106/286.4, 441, 450, 479

[56] References Cited

U.S. PATENT DOCUMENTS

| | | | |
|---|---|---|---|
| 4,495,276 | 1/1985 | Takimoto | 430/527 |
| 4,571,365 | 2/1986 | Ashlock et al. | 428/412 |
| 4,637,953 | 1/1987 | Sawamura | 428/333 |
| 5,094,691 | 3/1992 | Watanabe et al. | 106/286.4 |
| 5,165,992 | 11/1992 | Yajima | 428/328 |
| 5,188,667 | 2/1993 | Watanabe et al. | 106/286.4 |
| 5,225,057 | 7/1993 | LeFebvre | 204/192.26 |

FOREIGN PATENT DOCUMENTS

| | | |
|---|---|---|
| 4035418 | 8/1991 | Germany . |
| 56-116003 | 9/1981 | Japan . |
| 2-48418 | 2/1990 | Japan . |
| 2-262104 | 10/1990 | Japan . |
| 3-172369 | 7/1991 | Japan . |
| 3-217230 | 9/1991 | Japan . |

*Primary Examiner*—Patrick J. Ryan
*Assistant Examiner*—Patrick R. Jewik
*Attorney, Agent, or Firm*—Cushman Darby & Cushman

[57] ABSTRACT

An optional element having a cured coating film on optical base material wherein the cured coating film is prepared with a coating composition comprising an organosilicon compound and modified stannic oxide-zirconium oxide composite colloidal particles which are obtained by partially or fully coating the surface of stannic oxide-zirconium oxide composite colloidal particles with tungstic oxide-stannic oxide composite colloidal particles. The formed cured coating film is excellent in hot water resistance, and light-resistance and weathering resistance are not impaired even when the antireflection film made by vepor deposition of inorganic oxides is applied on the cured coating film.

18 Claims, No Drawings

OPTICAL ELEMENTS HAVING CURED COATING FILM

BACKGROUND OF THE INVENTION

1. Field of the Invention

The present invention relates to optical elements having a cured hard coating film wherein the coating film is excellent in hot water resistance, and light-resistance and weathering resistance are not impaired even when an antireflection film made by vapor deposition of inorganic oxides is applied on the coating film.

2. Description of the Related Art

It is well known to form a cured hard coating film containing an organosilicon polymer on the surface of synthetic resin of high refractive index such as polyurethane resin and halogen-containing resin so as to improve scuff or mar resistance of the resin. It is also known to contain a particulate metal oxide of high refractive index in a hard coating film so as to inhibit formation of interference fringes on the synthetic resin of high refractive index having tile hard coating film. For example, Japanese Patent Disclosure No. 172369/1991 discloses coating compositions containing an organosilicon compound and fine particles of stannous oxide coated with fine particles of tungstic oxide, and optical elements having a hard coating film formed therefrom.

The optical elements having hard coating film disclosed in Japanese Patent Disclosure No. 172369/1991, however, had the problem that light-resistance and weathering resistance are lowered when an antireflection film consisting of inorganic oxide vapor-deposited film is applied on the hard coating film on an optical base material. Therefore, the optical elements having the antireflection material are not preferable in appearance for lenses of glasses, since they tend to yellow easily with the passage of time.

The present invention has been made for eliminating said problems of the prior art, and it is intended to provide an optical element by the use of a coating composition wherein light-resistance and weathering resistance of the cured coating film formed with the coating composition are not lowered when the inorganic oxide vapor-deposited film is applied thereon.

SUMMARY OF THE INVENTION

The present invention relates to an optical element having a cured coating film on optical base material wherein the cured coating film is prepared with a coating composition comprising an organosilicon compound and modified stannic oxide-zirconium oxide composite colloidal particles which are obtained by partially or fully coating the surface of stannic oxide-zirconium oxide composite colloidal particles with tungstic oxide-stannic oxide composite colloidal particles.

The particle size of the modified stannic oxide-zirconium oxide composite colloidal particles is preferably in the range of 4.5 to 60 millimicrons. The particles are preferably formed by coating stannic oxide-zirconium oxide composite colloidal particles as core particles having the construction in which stannic oxide colloidal particles and zirconium oxide colloidal particles are combined in a $ZrO_2/SnO_2$ ratio of 0.02 to 1.0 based on the weight and having a particle size of 4 to 50 millimicrons with tungstic oxide-stannic oxide composite colloidal particles having a $WO_3/SnO_2$ ratio of 0.5 to 100 based on the weight and a particle size of 2 to 7 millimicrons.

DETAILED DESCRIPTION OF THE INVENTION

The present invention will be described in detail below.

The silicon compound used for the coating composition for the cured coating film of the present invention preferably contains the following component A and/or component B.

Component A:

An organosilicon compound or a hydrolyzate thereof, said organosilicon compound being represented by the formula (I):

$$(R^1)_a(R^3)_b Si(OR^2)_{4-(a+b)} \tag{I}$$

wherein $R^1$ and $R^3$ are each an organic group selected from the group consisting of alkyl group, alkenyl group, aryl group, acyl group, halogen group, glycidoxy group, epoxy group, amino group, phenyl group, mercapto group, methacryloxy group and cyano group; $R^2$ is an organic group selected from the group consisting of alkyl group having 1 to 8 carbon atoms, alkoxy group, acyl group and phenyl group; and a and b are each an integer of 0 or 1

Component B:

An organosilicon compound or a hydrolyzate thereof, said organosilicon compound being represented by the formula (II):

$$(OX)_{3-a}-Si(R^4_a)-Y-Si(R^4_a)-(OX)_{3-a} \tag{II}$$

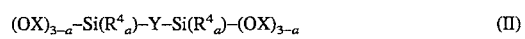

wherein $R^4$ is an organic group having 1 to 5 carbon atoms; X is an alkyl group having 1 to 4 carbon atoms or an acyl group having 1 to 4 carbon atoms; Y is an organic group having 2 to 20 carbon atoms; and a is an integer of 0 or 1.

As examples of the organosilicon compounds represented by the formula (I), or the hydrolyzates thereof, usable as component A in the present invention, there can be mentioned methyl silicate, ethyl silicate, n-propyl silicate, i-propyl silicate, n-butyl silicate, sec-butyl silicate, t-butyl silicate, tetraacetoxysilane, methyltrimethoxysilane, methyltriethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltrimethoxyethoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, σ-glycidoxybutyltrimethoxysilane, σ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltripropoxysilane, β-(3,4-epoxycyclohexyl)ethyltrimethoxyethoxysilane, β-(3,4-epoxycyclohexyl)ethyltriphenoxysilane, γ-(3,4-epoxycyclohexyl)propyltrimethoxysilane, γ-(3,4- epoxycyclohexyl)propyltriethoxysilane, σ-(3,4-epoxycyclohexyl)butyltrimethoxysilane, σ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldimethoxyethoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, γ-glycidoxypropylphenyldimethoxysilane, γ-glycidoxypropylphenyldiethoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)γ-aminopropyltrimethoxysilane, N-(β-aminoethyl)γ-aminopropylmethyldimethoxysilane, γ-aminopropylmethyldimethoxysilane, N-(β-aminoethyl)γ-aminopropyltriethoxysilane, N-(β-aminoethyl)γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, methylvinyldimethoxysilane, methylvinyldiethoxysilane and the hydrolyzates of these compounds.

The component B is described below.

As examples of the organosilicon compounds represented by the formula (II), or the hydrolyzates thereof, usable as component B in the present invention, there can be mentioned methylenebismethyldimethoxysilane, ethylenebisethyldimethoxysilane, propylenebisethyldiethoxysilane, butylenebismethyldiethoxysilane and the hydrolyzates of these compounds.

In use of the organosilicon compounds serving as component A and component B in the present invention, either an organosilicon compound for component A or component B is used alone or an organosilicon compound for component A and an organosilicon compound for component B are used in admixture. It is possible to use two or more types of organosilicon compounds for component A and those for component B.

Hydrolysis of the organosilicon compounds used as component A and component B in the present invention can be accomplished by adding an acid solution such as hydrochloric acid solution, acetic acid solution, sulfuric acid solution, and the like to an organosilicon compounds for component A and/or component B and stirring the resulting solution.

The modified stannic oxide-zirconium oxide composite colloidal particles contained in the coating composition used in the present invention is usually used in the form of sol.

The sol can be prepared in accordance with the method comprising the step (a), the step (b), the step (c) and the step (d) as mentioned below.

The step (a): a stannic oxide aqueous sol containing stannic oxide colloidal particles having particle size of 4 to 50 millimicrons in an amount corresponding to concentration of $SnO_2$ of 0.5 to 50% by weight and an aqueous solution containing oxyzirconium salt in an amount corresponding to concentration of $ZrO_2$ of 0.5 to 50% by weight are mixed in the ratio corresponding to the $ZrO_2/SnO_2$ ratio by weight of 0.02 to 1.0.

The step (b): the mixture resulting from the step (a) is heated in the temperature of 60 to 200° C. for 0.1 to 50 hours to form a stannic oxide-zirconium oxide composite aqueous sol having particle size of 4.5 to 60 millimicrons.

The step (c): an amount corresponding to 100 parts by weight of the total weight of $ZrO_2$ and $SnO_2$ of a stannic oxide-zirconium oxide composite aqueous sol resulting from the step (b) and an amount corresponding to 2 to 100 parts by weight of the total weight of $WO_3$ and $SnO_2$ of a tungstic oxide-stannic oxide composite sol having particle size of 2 to 7 millimicrons and $WO_3/SnO_2$ ratio by weight of 0.5 to 100 are mixed at the temperature of 0 to 100° C. to form modified stannic oxide-zirconium oxide composite aqueous sol having a particle size of 4.5 to 60 millimicrons.

The step (d): the modified stannic oxide-zirconium oxide composite aqueous sol resulting from the step (c) is contacted with anion exchanger to remove anions which are present in the sol.

The tungstic oxide-stannic oxide composite sol and the method for preparation thereof which are used for preparation of the sol may be each known one. An example thereof is disclosed in Japanese Patent Disclosure No. 217230/1991. Concentration of the tungstic oxide-stannic oxide composite sol is preferably not less than 1% by weight, especially 10 to 30% by weight. The preferable tungstic oxide-stannic oxide composite sol has pH of 1 to 9, and is a colorless or almost tranparent liquid. It is stable for three months or more at the room temperature, and for one month or more at 60° and no precipitate is formed therein. Furthermore, the viscosity thereof never increases, and no gelation is observed.

The sol of the stannic oxide-zirconium oxide composite colloidal particles as core particles which are used for preparation of the sol can be obtained by the method comprising the step (a) and the step (b).

The colloidal particles of the stannic oxide used in the step (a) can be prepared by known methods such as an ion exchanging method, a peptization method, a hydrolysis method and a reaction method in the form of colloidal particle sol having a particle size of about 4 to about 50 millimicrons.

Examples of oxyzirconium salts used in the step (a) include zirconium oxychloride, zirconium oxynitrate, zirconium oxysulfate, zirconium oxycarbonate or a zirconium oxyorganic acid such as zirconium oxyacetate.

When it is desirable to increase concentration of the sol obtained in the step (d), it is possible to concentrate the sol to about 50% by weight at most using conventional methods, for example, an evaporation method, an ultrafiltration method, and the like. For controlling pH of the sol, hydroxides such as hydroxides of alkaline metal, ammonium and the like; amines; oxycarbonic acids; and the like can be added thereto after the above-mentioned concentration. Especially, the sol having the total concentration of metal oxides of 10 to 40% by weight is practical.

Organosol can be obtained by substituting hydrophilic organic solvents for aqueous medium of the aqueous sol prepared in the step (d) or the step added thereto. The substitution can be conducted by a conventional method such as a distillation method, an ultrafiltration method, or the like. Examples of the hydrophilic organic solvents include a lower alcohol such as methyl alcohol, ethyl alcohol, isopropyl alcohol and the like; linear amides such as dimethyl formamide, N,N'-dimethyl acetamide and the like; cyclic amides such as N-methyl-2-pyrrolidone; glycols such as ethylcellosolve ethylene glycol and the like.

On applying the antireflection film made by vapor deposition of inorganic oxides on the cured coating film, when the cured coating film contains stannic oxide, the stannic oxide will be reduced to stannous oxide showing brown color or greenish blue color when exposed to ultraviolet light. However, when the cured coating film contains the modified stannic oxide-zirconium oxide composite colloidal particles, unexpectedly, the color does not change. The reason why the unexpectable effect can be attained may be due to the construction of the stannic oxide-zirconium oxide composite colloidal particles.

When heating the mixture of stannic oxide sol and an aqueous solution of oxyzirconium salt at 60° to 200° C., oxyzirconium salt is hydrolyzed to form fine colloidal particles of zirconium oxide having particle size of several millimicrons or less. The fine colloidal particles of zirconium oxide are bonded to the colloidal particles of stannic oxide to form the stannic oxide-zirconium oxide composite colloidal particles as core particles used for the prepartion of the sol of the present invention. This bond is a bond of a Sn atom and a Zr atom via oxygen atom, i. e. a bond represented by —Sn—O—Zr—O—Sn—. Therefore, it is considered that even when the colloidal particles of the composite of stannic oxide and zirconium oxide are irradiated with ultraviolet rays, the reduction of the stannic oxide to stannous oxide which causes coloring of the particles, will be substantially suppressed, whereby coloring of the particles scarcely occurs.

The above-mentioned stannic oxide and zirconium oxide composite colloidal particles are charged positively, tungstic oxide-stannic oxide composite colloidal particles are charged negatively. Accordingly, at the stage (c), the tungstic oxide-stannic oxide composite colloidal particles charged negatively are electrically attracted around the stannic oxide and zirconium oxide composite colloidal particles charged positively. Then, the tungstic oxide-stannic oxide composite colloidal particles charged negatively are combined with the stannic oxide and zirconium oxide composite colloidal particles charged positively as core particles. It is considered that the fact that the surface of the core particles charged positively is covered with the tungstic oxide-stannic oxide composite results in that the modified stannic oxide-zirconium oxide composite colloidal particles are formed. The reason why the modified stannic oxide-zirconium oxide composite colloidal particles coated with the tungstic oxide-stannic oxide composite are charged negatively is considered to be also due to the mechanism of formation thereof mentioned above.

The coating composition for forming the optical element according to the present invention preferably contains 1 to 500 parts by weight of the modified stannic oxide-zirconium oxide composite colloidal particles based on 100 parts by weight of organosilicon compound. This is for the reason that when said amount is less than 1 parts by weight, the produced cured coating film is lowered in refractive index and greatly limited in scope of application to base materials, whilst when said amount is more than 500 parts by weight, there arises the risk of causing cracking or other troubles between the coating film and base material as well as possibility of reducing transparency of the film.

Also, in the coating composition for forming the optical elements according to the invention, there may be contained a hardening agent for promoting the reaction, metal oxide particles for coordinating refractive index with the lens used as base material, and a surface active agent for the purposes of improving flow characteristics during the coating operation and smoothness of the cured coating film. It is also possible to blend other additives such as ultraviolet absorbing agent, antioxidant, etc, so far as they give no adverse effect to the properties of the produced cured coating film.

Examples of the above-mentioned hardening agents usable for said purpose in this invention are amines such as allylamine and ethylamine; acids and bases including Lewis acids and Lewis bases such as salts or metal salts of organic carboxylic acid, chromic acid, hypochlorous acid, boric acid, perchloric acid, bromic acid, selenious acid, thiosulfuric acid, orthosilicic acid, thiocyanic acid, nitrous acid, aluminic acid, carbonic acid and the like; and metal alkoxide having aluminum, zirconium, titanium and the like; and chelate compounds of these metal elements.

Examples of the above-mentioned particulate metal oxide include particles of aluminum oxide, titanium oxide, antimony oxide, zirconium oxide, silicon oxide, cerium oxide and the like.

As the base material used for the optical element of this invention, there can be mentioned plastic base material. Examples of the plastics include: methyl methacrylate homopolymer, copolymers of methyl methacrylate and one or more of other monomers, diethylene glycol bisallyl carbonate homopolymer, copolymers of methyl methyacrylate and one or more of other monomers, diethylene glycol bisallyl carbonate homopolymer, copolymers of diethylene glycol bisallyl carbonate and one or more of other monomers, copolymers containing sulphur, copolymers containing halogen, polycarbonate, polystyrene, polyvinyl chloride, polyethylene terephtalate, polyurethane and the like.

The above-mentioned coating composition can be applied on the base material and cured to form the cured coating film. Curing of the coating composition can be conducted by hot-air drying or irradiation of actinic radiation. Preferably, curing is conducted in hot-air at the temperature of 70° to 200° C., especially 90° to 150° C. Actinic radiation can be far infrared rays and the like which make it possible to inhibit damage by heat.

The method for applying the cured coating film comprising of the above-mentioned coating composition on the base material can be conventional methods such as dipping, spin coating, spray coating. Dipping and spin coating are preferable for high surface accuracy.

Prior to the application of said coating composition, a base material may be subjected to an appropriate treatment such as a chemical treatment with an acid, alkali or various types of organic solvent, a physical treatment with plasma, ultraviolet rays, etc., a washing treatment using various types of detergent or a primer treatment using various types of resin, thereby improving adhesion of the cured coating film to the base material.

Any conventional monolayer or multilayer vapor-deposited inorganic oxide antireflection films can be used as an antireflection film of vapor-deposited inorganic oxide prepared on the cured film of the optical element of this invention. Examples of the antireflection films are disclosed in Japanese Patent Disclosure Nos. 262104/1990 and

116003/1981.

The cured film of this invention can be used as a high reflection index layer of an antireflection film. Further, it may also be provided with various functions such as anti-fogging, photochromic action, anti-fouling, etc., to serve as a multi-function film.

The optical elements having a cured coating film of this invention can be used as lenses of eyeglasses as well as lenses for cameras, window glasses for automobiles, and optical filters applied to displays of word processors.

EXAMPLES

Reference Example 1

To obtain modified stannic oxide-zirconium oxide composite colloidal particles, stannic oxide aqueous sol and tungstic oxide-stannic oxide composite aqueous sol were prepared. The stannic oxide aqueous sol had specific gravity of 1.029, pH of 9.80, viscosity of 1.4 mPa·s, $SnO_2$ content of 2.95% by weight, and isopropylamine content of 0.036% by weight. Tungsten oxide-stannic oxide composite were prepared by the method disclosed in Japanese Patent Disclosure No. 217230/1991, and had specific gravity of 1.013, pH of 2.61, viscosity of 1.5 mPa·s, $WO_3$ content of 0.77% by weight, and $SnO_2$ content of 0.85% by weight.

The modified stannic oxide-zirconium oxide composite aqueous sol was prepared in accordance with the following steps (a) to (f).

The step (a);

Zirconium oxychloride aqueous solution having $ZrO_2$ content of 2.0% by weight was prepared by dissolving zirconium oxychloride ($ZrOCl_2 \cdot 8H_2O$) in water.

To 2155 g of the resultant zirconium oxychloride aqueous solution, 9735 g of the above-mentioned stannic oxide-zirconium oxide composite aqueous sol (corresponding to 287 g of $SnO_2$) was added with stirring at room temperature, and kept stirring for 2 hours to form a mixture with the $ZrO_2/SnO_2$ weight ratio of 0.15 and pH of 1.50. Although the mixture had colloidal color, the transparency thereof was good.

The step (b);

The mixture prepared in the step (a) was heated with stirring at 90° C. for 5 hours to obtain 11890 g of stannic oxide-zirconium oxide composite aqueous sol. The sol contained 2.41% by weight of $SnO_2$ and 0.36% by weight of $ZrO_2$ and had pH of 1.45. Although the sol had colloidal color, the transparency thereof was good.

The step (c);

To 6110g of the above tungstic oxide-stannic oxide composite aqueous sol, 12890 g of stannic oxide-zirconium oxide composite aqueous sol obtained in the step (b) was added with stirring at room temperature over 20 minutes. After additional stirring for 30 minutes, milky-turbid aqueous sol with pH 1.45 and total amount of metal oxides of 2.38 weight % was obtained.

The step (d);

18000 g of the milky-turbid aqueous sol obtained in the step (c) was passed through the column of Amberlite 410 which is a hydroxy group type of anion-exchange resin to obtain 21000 g of the modified stannic oxide-zirconium oxide composite aqeous sol. The sol had total amount of metal oxides of 2.04 weight %, and pH of 9.00. Although the sol had colloidal color, the transparency thereof was good.

The step (e);

The modified stannic oxide-zirconium oxide composite aqeous sol obtained in the step (d) was concentrated by using an ultrafiltration film (fractionating molecular weight: 50,000) at room temperature to obtain 1810 g of high concentration of the modified stannic oxide-zirconium oxide composite aqueous sol. The sol had specific gravity of 1.260, pH of 8.18, viscosity of 24.0 mPa·s, and total amount of metal oxides of 23.6% by weight, and was stable.

The step (f);

To 465 g of the highly concentrated modified stannic oxide-zirconium oxide composite aqeous sol obtained in the step (e), 2.2 g of tartaric acid, 3.3 g of diisobutylamine and one drop of anti-foaming agent (SN Defoamer, San Nopco Limited) with stirring at room temperature, stirred for one hour to obtain the prepared sol having pH of 8.22.

The prepared sol was evaporated in a rotary evaporator under reduced pressure at the solution temperature of 30° C. or lower with adding nine liters of methanol little by little to remove water from the sol. 348 g of the modified stannic oxide-zirconium oxide composite methanol sol was obtained.

The sol obtained in the step (f) had the specific gravity of 1.103, viscosity of 3.2 mPa·s, total amount of metal oxides of 31.5% by weight, and water content of 0.62% by weight. pH of the sol when mixed with equal weight of water was 7.90, and particle size observed under an electron microscope was 10 to 15 millimicrons. The sol had colloidal color and the transparency thereof was good. After standing for three months at room temperature, any precipitates, any milky-turbidity and increase of viscosity were not observed, and the sol was stable. The refractive index of the sol after drying was 1.79.

The present invention will hereinafter be described more particularly by showing examples thereof. It is to be understood, however, that these examples are merely intended to be illustrative and not to be construed as limiting the scope of the invention.

The properties of the optical materials having cured coating film obtained in Examples and Comparative Examples were determined according to the following methods.

(1)Scuff resistance test

The lens surface was rubbed with steel wool #0000 and the degree of resistance to scuffing was visually judged. Scuff resistance was evaluated according to the following criteria:

A: The lens surface is scarcely scuffed even when rubbed strongly.

B: The lens surface is scuffed to a notable degree when rubbed strongly.

C: The lens surface is scuffed equally to the base material.

(2)Presence or absence of interference fringe

Presence or absence of interference fringe on each of the optical elements having the cured coating film was visually judged under a fluorescent lamp. Judgement was made according to the following criteria:

A: Interference fringe is scarcely seen.

B: Interference fringe is seen slightly.

C: Interference fringe is seen conspicuously.

(3)Adhesion test

Each test piece of cured coating film was crosscut to 100 sections at intervals of 1 mm, and an adhesive tape (a trademark "Cellotape" produced by Nichiban Co., Ltd.) was strongly stuck to the crosscut test film and then rapidly peeled off, examining occurrence or non-occurrence of consequent separation of the cut section(s) of the film.

(4)Hot water resintance test

Each test piece was immersed in hot water of 45° C. for 5 hours and then subjected to the adhesion test.

(5) Transparency

Clouding of the cured coating film was visually examined under a fluorescent lamp in a dark room. Evaluation was made according to the following criteria:

A: Clouding is scarcely admitted.

B: Clouding is admitted slightly.

C: Clouding is admitted evidently.

The following tests (6) and (7) were conducted for the lens wherein vapor-deposited film of inorganic oxides as antireflection film mentioned below on cured coating film.

(6) Light-resistance test

The optical material was exposed to xenon irradiation in a xenon long life weather meter a vailable from Suga Test Instrument Company Limited for 200 hours, and change of appearance of the optical material after exposure was visually observed.

(7) Weathering resistance test

The optical material was subjected to outdoor exposure test for one month, and change of appearance of the optical material after exposure was visually observed.

EXAMPLE 1

(Preparation of coating solution)

142 parts by weight of γ-glycidoxypropyltrimethoxysilane as component A was supplied into a glass-made container equipped with a magnetic stirrer, followed by dropwise addition of 1.4 parts by weight of 0.01N hydrochloric acid and 32 parts by weight of water with stirring. Thereafter, the mixture was stirred for 24 hours to obtain a hydrolyzate of γ-glycidoxypropyltrimethoxysilane. Then, 460 parts by weight of stannic oxide-zirconium oxide composite sol prepared in Reference Example 1 (dispersed in methanol, having total amount of metal oxides of 31.5% by weight and average particle size of 10 to 15 millimicrons), 300 parts by weight of ethyl cellosolve, 0.7 parts by weight of silicone surfactant as a lubricant and 8 parts by weight of aluminum acetyl acetonate were added to the above-mentioned hydrolyzate of γ-glycidoxypropyltrimethoxysilane, stirred sufficiently, and filtered to prepare the coating solution. (Formation of cured coating film and antireflection film)

A plastic lens (refractive index nd:1.60) composed of xylylenediisocyanate treated with alkaline solution and pentaerithlitol (2-mercapto acetate) was sufficiently washed, and immersed in the coating solution prepared by the above-mentioned method, and subjected to dip coating using said coating solution (pull-up rate: 14 cm/min) and heated at 130° C. for 2 hours to form a cured coating film. The obtained coated lens was subjected to various evaluation tests.

As shown in Table 1, on the plastic lens having a cured coating film obtained according to the above-described method, interference fringe was scarcely seen, haze value was 0.1, and transparency was excellent also in visual test. An antireflection film was formed on the cured coating film of the plastic lens of Example 1 as mentioned below and the resulting lens was subjected to light-resistance test and weathering resistance test.

The plastic lens having cured coating film prepared as mentioned above was placed in a vapor deposition apparatus, heated to 85° C. with evacuating, and kept evacuating to $2 \times 10^{-5}$ Torr. Then, vaporization materials were vapor-deposited by electron beam heating method to apply the lower layer of $SiO_2$ having film thickness of 0.6γ; and thereon, the first refractive layer consisting of a mixed layer of $Ta_2O_5$, $ZrO_2$ and $Y_2O_3$ (nd=2.05, n γ=0.075γ) and $SiO_2$ layer (nd=1.46, n γ=0.056γ); and the second refractive layer consisting of a mixed layer of $Ta_2O_5$, $ZrO_2$ and $Y_2O_3$ (nd=2.05, nγ=0.46γ) and $SiO_2$ layer (nd=1.46, nγ=0.25 γ) to obtain the antireflection layer. Appearance of plastic lens did not visually change even after exposure to xenon irradiation or after outdoor exposure, and light-resistance and weathering resistance were excellent.

EXAMPLE 2

The procedures of Example 1 were followed except that 100 parts by weight of β-(3,4-epoxycyclohexyl) ethyltrimethoxysilane and 35 parts by weight of γ-glycidoxypropylmethyldiethoxysilane were used as component A in place of 142 parts by weight of γ-glycidoxypropyltrimethoxysilane. The evaluation results shown in Table 1 indicated that the properties of the obtained coated lens were excellent as same as those of Example 1.

EXAMPLE 3

The procedures of Example 1 were followed except that 30 parts by weight of tetraethoxysilane and 105 parts by weight of γ-glycidoxypropylmethyldiethoxysilane were used as component A in place of 142 parts by weight of γ-glycidoxypropyltrimethoxysilane, and 5 parts by weight of aluminum acetyl acetonate as a hardner and 1 parts by weight of ammonium perchlorate were used. The evaluation results shown in Table 1 indicated that the properties of the obtained coated lens were excellent as same as those of Example 1.

EXAMPLE 4

The procedures of Example 1 were followed except that 100 parts by weight of γ-glycidoxypropyltrimethoxysilane and 42 parts by weight of γ-glycidoxypropylmethyldimethoxysilane were used as component A. The evaluation results shown in Table 1 indicated that properties of the obtained coated lens were excellent as same as those of Example 1.

EXAMPLE 5

The procedures of Example 1 were followed except that 50 parts by weight of γ-glycidoxypropyltrimethoxysilane, 50 parts by weight of γ-glycidoxypropylmethyldiethoxysilane and 32 parts by weight of tetraethoxysilane were used as component A in place of 142 parts by weight of γ-glycidoxypropyltrimethoxysilane. The evaluation results shown in Table 1 indicated that the properties of the obtained coated lens were excellent as same as those of Example 1.

EXAMPLE 6

The procedures of Example 1 were followed except that a plastic lens (refractive index nd:1.61) composed of 1,2-dihydroxybenzene and pentaerythritol tetrakismercaptoacetate and 2,5-mercaptomethyl 1,4-dithian were used. The evaluation results shown in Table 1 indicated that properties of the obtained coated lens were excellent as same as those of Example 1.

EXAMPLE 7

The procedures of Example 1 were followed except that a plastic lens (refractive index nd:1.60) composed of 1,3-bis(isocyanatemethyl)cyclohexane and pentaerythritol tetrakismercaptoacetate and 2,5-mercaptomethyl 1,4-dithian was used. The evaluation results shown in Table 1 indicated that the properties of the obtained coated lens were excellent as same as those of Example 1.

EXAMPLE 8

The procedures of Example 1 were followed except that a plastic lens (refractive index nd:1.59) composed of 3mercapto 1,2-dihydroxypropane, pentaerythritol tetrakismercaptoacetate and 2,5-mercaptomethyl 1,4-dithian was used. The evaluation results shown in Table 1 indicated that the properties of the obtained coated lens were excellent as same as those of Example 1.

Comparative Example 1

The procedures of Example 1 were followed except that 480 parts by weight of stannous oxide sol coated with tungstic oxide fine particles disclosed in Japanese Patent Disclosure No. 172369/1991 was used in place of the sol used in Example 1. The evaluation results shown in Table 1 indicated that light-resistance and weathering resistance were poor.

Comparative Example 2

The procedures of Example 1 were followed except that 480 parts by weight of antimony oxide sol (dispersed in methanol, solid content: 30%, average particle size: 20 millimicrons) was used in place of the sol used in Example 1. The evaluation results shown in Table 1 indicated that hot water resistance and scuff resistance were poor.

Comparative Example 3

The procedures of Example 1 were followed except that colloidal silica (dispersed in methanol, solid content: 20 weight %, average particle size: 15 mμ) was used in place of the sol used in Example 1. The evaluation results shown in Table 1 that unfavorable interference fringe due to low reflactive index of the cured coating film was observed.

As described above, the present invention provides optical elements having a cured coating film without impaired in their specific properties, and furthermore, without impaired in light-resistance and weathering resistance even when the antireflection film made by vapor deposition of inorganic oxides is applied on the cured coating film.

What is claimed is:

1. An optical element having a cured coating film on an optical base material wherein the cured coating film is prepared with a coating composition comprising 100 parts by weight of an organosilicon compound and 1 to 500 parts by weight coated stannic oxide-zirconium oxide composite colloidal particles which are obtained by partially or fully coating the surface of stannic oxide-zirconium oxide composite colloidal particles with tungstic oxide-stannic oxide composite colloidal particles.

2. The optical element of claim 1 wherein the particle size of the coated stannic oxide-zirconium oxide composite colloidal particles is in the range of 4.5 to 60 millimicrons.

3. The optical element of claim 1 wherein the stannic oxide-zirconium oxide composite colloidal particles as core particles are the combination product of stannic oxide colloidal particles and zirconium oxide colloidal particles.

4. The optical element of claim 3 wherein the stannic oxide-zirconium oxide composite colloidal particles have a weight ratio of $ZrO_2/SnO_2$ of 0.02 to 1.0 and a particle size of 4 to 50 millimicrons.

5. The optical element of claim 3 wherein the tungstic-stannic oxide composite colloidal particles have a weight ratio of $WO_3/SnO_2$ of 0.5 to 100 and a particle size of 2 to 7 millimicrons.

6. The optical element of claim 1 wherein the organosilicon compound comprises at least one member selected from the group consisting of component A represented by the following formula (I), dydrolyzates thereof, component B represented by the formula (II) and hydrolyzates thereof:

$$(R^1)_a(R^3)_b Si(OR^2)_{4-(a+b)} \qquad (I)$$

wherein $R^1$ and $R^3$ are each an organic group selected from the group consisting of alkyl group, alkenyl group, aryl group, acyl group, halogen group, glycidoxy group, epoxy group, amino group, phenyl group, mercapto group, methacryloxy group and cyano group; $R^2$ is an organic group selected from the group consisting of alkyl group having 1 to 8 carbon atoms, alkoxy group, acyl group and phenyl group; and a and b are each an integer of 0 or 1;

$$(OX)_{3-a}-Si(R^4_a)-Y-Si(R^4_a)-(OX)_{3-a} \qquad (II)$$

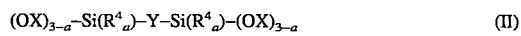

TABLE 1

|  | Scuff resistance | Interference fringe | Adhesive ness | Hot water resistance | Transparency | Light-resistance | Weather resistance |
|---|---|---|---|---|---|---|---|
| Ex. 1 | A | A | Good | Good | A | No change | No change |
| Ex. 2 | A | A | Good | Good | A | No change | No change |
| Ex. 3 | A | A | Good | Good | A | No change | No change |
| Ex. 4 | A | A | Good | Good | A | No change | No change |
| Ex. 5 | A | A | Good | Good | A | No change | No change |
| Ex. 6 | A | A | Good | Good | A | No change | No change |
| Ex. 7 | A | A | Good | Good | A | No change | No change |
| Ex. 8 | A | A | Good | Good | A | No change | No change |
| Compara. Ex. 1 | A | A | Good | Good | A | Yellowing | Yellowing |
| Compara. Ex. 2 | B | B | Good | Pealed off | B | No change | No change |
| Compara. Ex. 3 | A | C | Good | Good | A | No change | No change | wherein $R^4$ is an organic group having 1 to 5 carbon atoms; X is an alkyl group having 1 to 4 carbon atoms or an acyl group having 1 to 4 carbon atoms; Y is an organic group having 2 to 20 carbon atoms; and a is an integer of 0 or 1.

7. The optical element of claim 6 wherein the organosilicon compound comprises at least one member selected from the group consisting of component A represented by the following formula (I) and hydrolyzates thereof.

8. The optical element of claim 6 wherein the organosilicon compound comprises at least one member selected from the group consisting of component B represented by the following formula (II) and hydrolyzates thereof.

9. The optical element of claim 1 wherein the optical base material is a plastic base material.

10. The optical element of claim 9 wherein the a plastic base material is one selected from the group consisting of methyl methacrylate homopolymer, copolymers of methyl methacrylate and one or more of other monomers, diethylene glycol bisallyl carbonate homopolymer, copolymers of methyl methyacrylate and one or more of other monomers, diethylene glycol bisallyl carbonate homopolymer, copolymers of diethylene glycol bisallyl carbonate and one or more of other monomers, copolymers containing sulphur, copolymers containing halogen, polycarbonate, polystyrene, polyvinyl chloride, polyethylene terephtalate and polyurethane.

11. The optical element of claim 1 wherein the optical element further has an antireflection film made by vapor deposition.

12. The optical element of claim 11 wherein the antireflection film is a monolayer inorganic oxide film.

13. The optical element of claim 11 wherein the antireflection film is a multilayer inorganic oxide film.

14. The optical element of claim 4 wherein the tungstic-stannic oxide composite colloidal particles have a weight ratio of $WO_3/SnO_2$ of 0.5 to 100 and a particle size of 2 to 7 millimicrons.

15. The optical element of claim 1 wherein said coating composition comprises a sol having up to 50% by weight coated stannic oxide-zirconium oxide composite colloidal particles.

16. The optical element of claim 15, wherein said sol comprises from 10–40% by weight coated stannic oxide-zirconium oxide composite colloidal particles.

17. The optical element of claim 14 wherein said coating composition comprises a sol having up to 50% by weight coated stannic oxide-zirconium oxide composite colloidal particles.

18. The optical element of claim 17, wherein said sol comprises from 10–40% by weight coated stannic oxide-zirconium oxide composite colloidal particles.

* * * * *